(12) United States Patent
Chi

(10) Patent No.: US 11,281,052 B2
(45) Date of Patent: Mar. 22, 2022

(54) LIQUID CRYSTAL DISPLAY PANEL HAVING MULTI-SIGNAL HVA MODE

(71) Applicant: Shenzhen China STAR OPTOELECTRONICS SEMICONDUCTOR DISPLAY TECHNOLOGY CO., LTD., Guangdong (CN)

(72) Inventor: Maoqiang Chi, Guangdong (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 301 days.

(21) Appl. No.: 16/618,893

(22) PCT Filed: Nov. 4, 2019

(86) PCT No.: PCT/CN2019/115416
§ 371 (c)(1),
(2) Date: Dec. 3, 2019

(87) PCT Pub. No.: WO2021/003908
PCT Pub. Date: Jan. 14, 2021

(65) Prior Publication Data
US 2021/0405461 A1    Dec. 30, 2021

(30) Foreign Application Priority Data
Jul. 10, 2019   (CN) .......................... 201910620507.X

(51) Int. Cl.
G02F 1/1337    (2006.01)
G02F 1/1345    (2006.01)
G02F 1/1339    (2006.01)
G02F 1/1335    (2006.01)

(52) U.S. Cl.
CPC ...... *G02F 1/133742* (2021.01); *G02F 1/1339* (2013.01); *G02F 1/13454* (2013.01); *G02F 1/133514* (2013.01)

(58) Field of Classification Search
CPC .................................. G02F 1/133742
See application file for complete search history.

(56) References Cited

U.S. PATENT DOCUMENTS

2017/0059923 A1* 3/2017 Ye .......................... G02F 1/1345

* cited by examiner

*Primary Examiner* — Edmond C Lau

(57) ABSTRACT

The present disclosure provides a liquid crystal display panel having a multi-signal high vertical alignment (HVA) mode. By changing conductive materials of conductive structures, voltage signals via signal transmission portions can be changed in a transmission process. Different signal transmission portions may have different conductive materials, so that the voltage signals can be changed with different degrees to implement the multi-signal transmission in the HVA manufacturing process. Furthermore, the HVA manufacturing process can be controlled accurately and effectively, and thus the effect of the alignment is better.

18 Claims, 2 Drawing Sheets

LIQUID CRYSTAL DISPLAY PANEL HAVING MULTI-SIGNAL HVA MODE

BACKGROUND

Field

The present disclosure relates to the field of display technology, and more particularly to a liquid crystal display panel having a multi-signal HVA mode.

Background

A liquid crystal display (LCD) device has various advantages that power consumption is low, weight is light, a thickness is thin, and images are exquisite. The liquid crystal display device is widely used in the field of display technology. A liquid crystal display panel is a core component of the liquid crystal display device. Currently, liquid crystal display panels are classified into three types on the market including a twisted nematic (TN) or super twisted nematic (STN) type, an in-plane switching (IPS) type, and a vertical alignment (VA) type. A high vertical alignment (HVA) type is one important branch of the VA type. In the HVA mode, rotations of liquid crystal molecules in a liquid crystal layer are controlled by a vertical electric field formed by pixel electrodes on an array substrate and a common electrode on a color filter substrate when the liquid crystal display panel operates.

Please refer to FIG. 1. FIG. 1 illustrates a layer structure of a conventional liquid crystal display panel. The structure of the conventional liquid crystal display panel is generally constituted by a color filter (CF) substrate 11, an array substrate 12, and a liquid crystal layer (LCL) 13 disposed between the two substrates. The color filter substrate 11 has a common electrode (CFcom) 111 and a color filter (CF) 112 formed thereon. The array substrate 12 has a signal transmission portion (curing pad) 121, an array layer 122, a pixel electrode 123, and a common electrode (Acom) 124 formed thereon. The common electrode (CFcom) 111 and the common electrode (Acom) 124 are transparent electrically-conductive films. The common electrode 111 (CFcom) and the common electrode 124 (Acom) are coupled together by coating a seal layer 15 having an electrically-conductive gold ball (Au ball) 14 on the signal transmission portion (curing pad) 121 outside a display area. The common electrode (Acom) 124 is electrically coupled to the common electrode (CFcom) 111 via the signal transmission portion (curing pad) 121 and the electrically-conductive gold ball 14, so that a HVA curing signal is transmitted from the color filter substrate 11 to the array substrate 12 via the electrically-conductive gold ball 14.

Please refer to FIG. 2. FIG. 2 illustrates that the common electrode 111 on the color filter substrate 11 is insulated in an area-dividing manner by an LOC technology. Since the common electrode 111 is coated on a whole surface of the color filter substrate 11 in the manufacturing process of the liquid crystal display panel, it is necessary to use the LOC technology to etch and cure the common electrode 111, so that the common electrode 111 on the color filter substrate 11 is insulated in the area-dividing manner. The LOC (Laser Patterning on CF) technology refers to that the common electrode 111 coated on the whole surface of the color filter substrate 11 is insulated in the area-dividing manner by laser, so as to form high voltage areas 211 configured to transmit a high voltage signal H and ground signal areas 212 configured to transmit a ground signal L. Gaps between different areas are burned by laser. As such, different HVA curing signals can be transmitted from the color filter substrate 11 to the array substrate 12 via the electrically-conductive gold balls 14 and the signal transmission portions 121. Voltage differences are generated to rotate the liquid crystal molecules, so as to implement the alignment by the color filter substrate 11. The LOC technology has advantages that a jig can be shared and a demand for alignment of substrates in a large generation can be met.

Current liquid crystal display products are designed by a gate driver on array (GOA) technology, and a shared common electrode separately exists. There are many signal transmission portions. However, due to limitations of design, the current HVA curing signals only include the high voltage signal H and the ground signal L. The high voltage signal H and the ground signal L are difficult to meet the practical demand for alignment. Consequently, it is necessary to develop and design a liquid crystal display panel having a multi-signal HVA mode under the background of the LOC technology.

SUMMARY OF THE DISCLOSURE

An objective of the present disclosure is to provide a liquid crystal display panel having a multi-signal high vertical alignment (HVA) mode capable of implementing a multi-signal transmission under the background of the LOC technology and improving the effect of the alignment.

To achieve the above-mentioned objective, the present disclosure provides a liquid crystal display panel having a multi-signal high vertical alignment (HVA) mode. The liquid crystal display panel includes: a first substrate, the first substrate including a first common electrode layer, and the first common electrode layer including a first voltage signal area; a second substrate cell-assembled with the first substrate, and the second substrate including at least one first signal transmission portion; a seal layer disposed between the first substrate and the second substrate, and the seal layer disposed in a non-display area of the liquid crystal display panel; and at least one first conductive structure disposed between the first substrate and the second substrate, the first conductive structure disposed inside the seal layer and corresponding to a position of the first signal transmission portion, and the first conductive structure made of a conductive material of voltage decreasing, configured to electrically couple the first signal transmission portion to the first voltage signal area, and configured to change a voltage signal which is transmitted from the first voltage signal area to the first signal transmission portion.

To achieve the above-mentioned objective, the present disclosure further provides a liquid crystal display panel having a multi-signal high vertical alignment (HVA) mode. The liquid crystal display panel includes: a first substrate, the first substrate including a first common electrode layer, and the first common electrode layer including a first voltage signal area; a second substrate cell-assembled with the first substrate, and the second substrate including at least one first signal transmission portion; and at least one first conductive structure disposed between the first substrate and the second substrate, the first conductive structure disposed a non-display area of the liquid crystal display panel and corresponding to a position of the first signal transmission portion, and the first conductive structure configured to electrically couple the first signal transmission portion to the first voltage signal area and configured to change a voltage signal which is transmitted from the first voltage signal area to the first signal transmission portion.

The advantages of the present disclosure are described as follows. In the present disclosure, by changing conductive materials of the conductive structures, the voltage signals via the signal transmission portions can be changed in a transmission process. Accordingly, the effect that the voltage signals at the common electrode layer on the first substrate are the same but the voltage signals at different signal transmission portions on the second substrate are different can be achieved. Different signal transmission portions may have different conductive materials, so that the voltage signals can be changed with different degrees to implement the multi-signal transmission in the HVA manufacturing process. The HVA manufacturing process can be controlled accurately and effectively, and thus the effect of the alignment is better. The conductive materials may be mixed into the seal layer to avoid a new manufacturing process. A whole surface of the common electrode layer on the first substrate can be insulated in the area-dividing manner by the LOC technology. Based on the premise that manufacturing devices remain unchanged, the problem that the curing signals cannot be changed in the conventional LOC products can be solved. As such, a multi-signal transmission can be implemented in the LOC technology, and the effect of the alignment is better in the HVA manufacturing process.

BRIEF DESCRIPTION OF THE DRAWINGS

In order to more clearly illustrate the embodiments or the technical schemes in the prior art, the following drawings of the embodiments or in the prior art will be briefly introduced. It is obvious that the drawings are merely some embodiments of the present disclosure, those skilled in the art may derive other drawings according the drawings described below without creative endeavor.

DETAILED DESCRIPTION OF THE PREFERRED EMBODIMENTS

Figure 1:
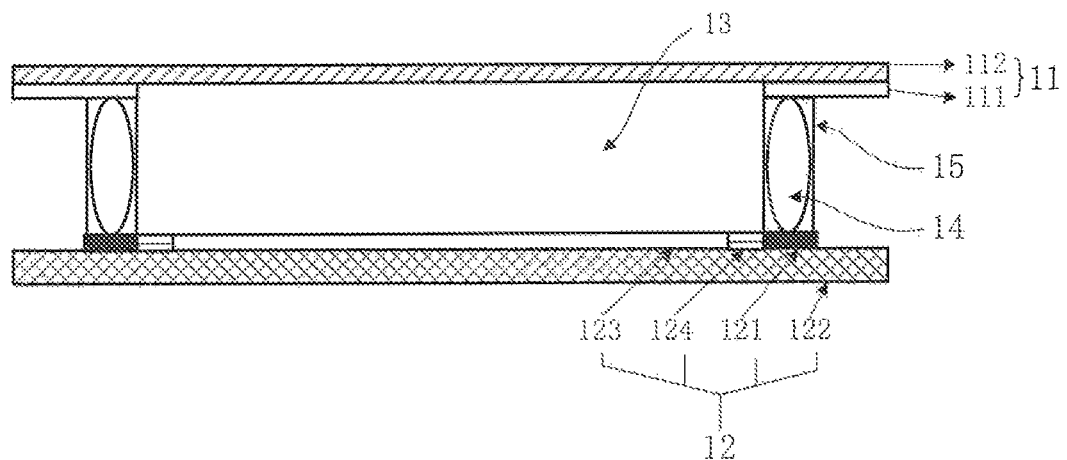
FIG. 1 illustrates a layer structure of a conventional liquid crystal display panel.

Hereinafter, exemplary embodiments of the present disclosure will be described with reference to the accompanying drawings. The same or similar elements or the elements with the same or similar functions will be designated by the same or similar reference numerals all through the following description and drawings. The following embodiments described with the accompanying drawings are merely exemplary to explain the present disclosure and not to be construed as limiting the present disclosure.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

It can be appreciated from the background technology that there are many signal transmission portions in the manufacturing process of a conventional liquid crystal display panel. However, due to limitations of design, the current HVA curing signals only include the high voltage signal H and the ground signal L. The high voltage signal H and the ground signal L are difficult to meet the practical demand for alignment. The HVA manufacturing process cannot be controlled accurately and effectively, and thus the effect of the alignment is poor.

Based on the above-mentioned problem, the present disclosure provides a new liquid crystal display panel having a multi-signal HVA mode. By changing conductive materials of conductive structures configured to electrically couple a common electrode layer on a first substrate and signal transmission portions (curing pads) on a second substrate, voltage signals via the signal transmission portions can be changed in a transmission process. Accordingly, the effect that the voltage signals at the common electrode layer on the first substrate are the same but the voltage signals at different signal transmission portions on the second substrate are different can be achieved. When there are plural signal transmission portions, at least two of the signal transmission portions have different voltage signals. That is, different signal transmission portions may have different conductive materials, so that the voltage signals can be changed with different degrees to implement the multi-signal transmission in the HVA manufacturing process. The conductive materials having different effects of voltage decreasing may be selected to be added to a seal layer corresponding to positons of the signal transmission portions, so as to implement a glue dispensing process and electrically couple the two substrates. In the present disclosure, the HVA manufacturing process can be controlled accurately and effectively, and thus the effect of the alignment is better. The conductive materials may be mixed into the seal layer (such as an electrically-conductive gold ball) to avoid a new manufacturing process. The common electrode layer on the first substrate can be insulated in the area-dividing manner by the LOC technology. Based on the premise that manufacturing devices remain unchanged, the problem that the curing signals cannot be changed in the conventional LOC products can be solved. As such, a multi-signal transmission can be implemented in the LOC technology, and the effect of the alignment is better in the HVA manufacturing process.

Figure 3:
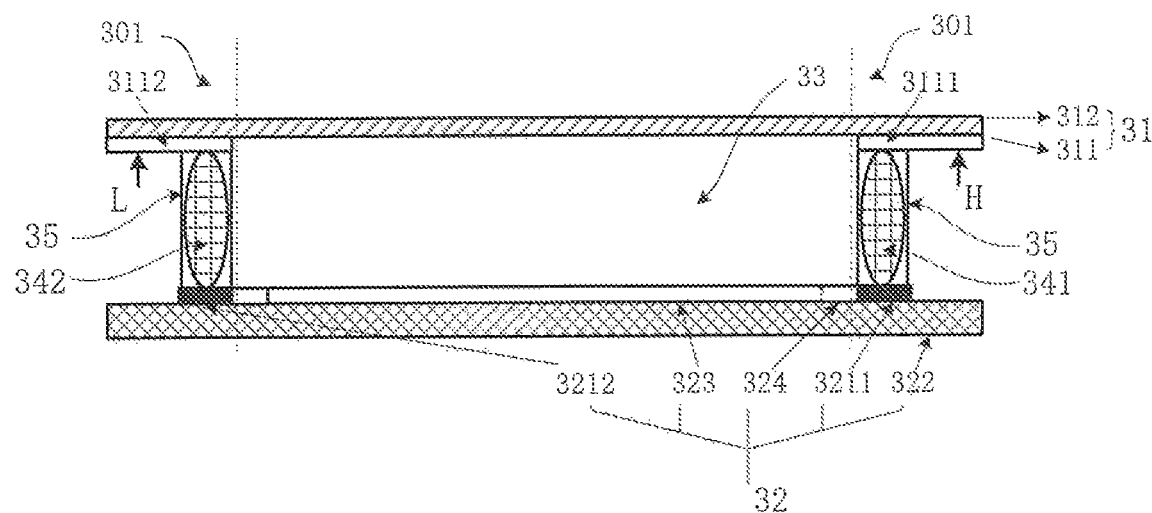
FIG. 3 illustrates a layer structure of the liquid crystal display panel having the multi-signal HVA mode in accordance with an embodiment of the present disclosure.
Figure 4:
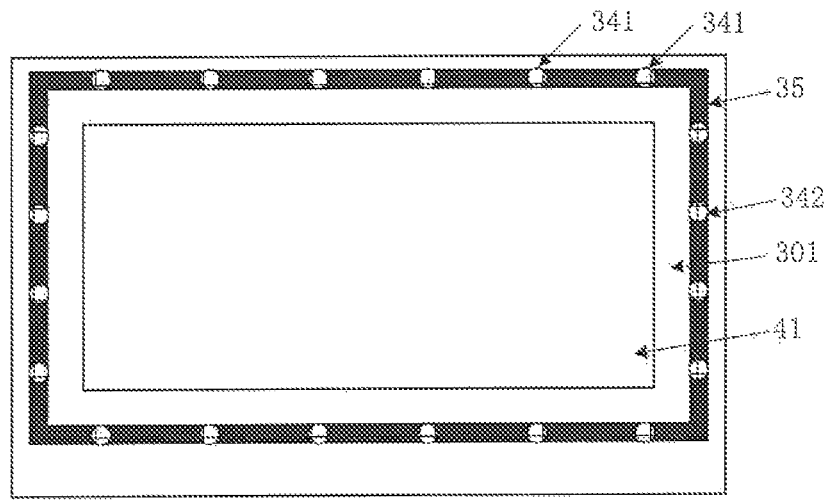
FIG. 4 illustrates a cross-sectional view of the liquid crystal display panel in FIG. 3.
Figure 5:
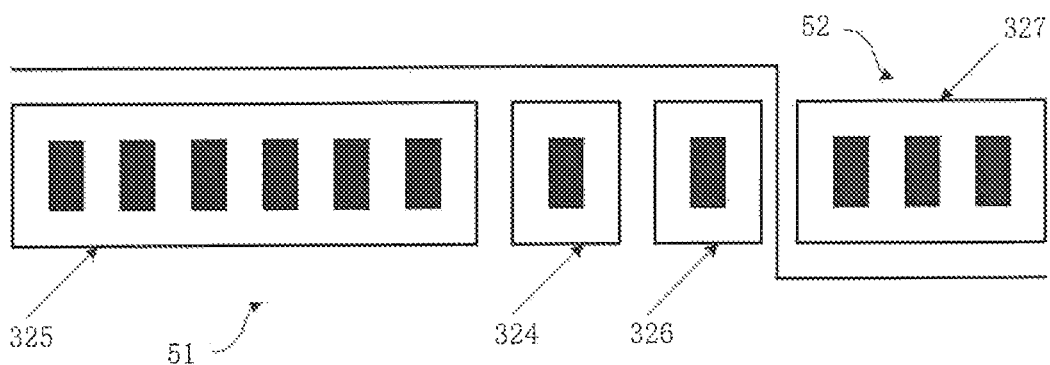
FIG. 5 illustrates a distribution diagram of signal transmission portions in accordance with the present disclosure.

Please refer to FIG. 3 to FIG. 5. FIG. 3 illustrates a layer structure of the liquid crystal display panel having the multi-signal HVA mode in accordance with an embodiment of the present disclosure. FIG. 4 illustrates a cross-sectional view of the liquid crystal display panel in FIG. 3. FIG. 5 illustrates a distribution diagram of signal transmission portions in accordance with the present disclosure.

As shown in FIG. 3, the liquid crystal display panel having the multi-signal HVA mode includes a first substrate 31, a second substrate 32, a liquid crystal layer 33 disposed between the first substrate 31 and the second substrate 32, and at least one first conductive structure 341.

The first substrate 31 includes a first common electrode layer 311. The first common electrode layer 311 includes a first voltage signal area 3111. It is noted that the first substrate 31 further includes any other necessary components when an image is displayed. For example, when the first substrate 31 is a color filter substrate, the first substrate 31 further includes a color filter (CF) 312. The first common electrode layer 311 may be a transparent electrically-conductive layer made of an indium tin oxide (ITO) material.

The second substrate 32 is cell-assembled with the first substrate 31. The second substrate 32 includes at least one first signal transmission portion 3211. It is noted that the second substrate 32 further includes any other necessary components when an image is displayed. For example, when the second substrate 32 is an array substrate, the second substrate 32 further includes an array layer 322, a pixel electrode 323, and a second common electrode 324. The second common electrode 324 is electrically coupled to the first signal transmission portion 3211, so that a voltage signal is transmitted to the second common electrode 324 via the first signal transmission portion 3211 and then transmitted to the pixel electrode 323.

The first conductive structure 341 is disposed between the first substrate 31 and the second substrate 32. The first conductive structure 341 is disposed in a non-display area 301 of the liquid crystal display panel and corresponds to a position of the first signal transmission portion 3211. The first conductive structure 341 is configured to electrically couple the first signal transmission portion 3211 to the first voltage signal area 3111 and configured to change the voltage signal which is transmitted from the first voltage signal area 3111 to the first signal transmission portion 3211. That is, after the high voltage signal H is transmitted to the first voltage signal area 3111 which is divided from the first common electrode layer 311, the voltage which is transmitted to the first signal transmission portion 3211 is changed because the first conductive structure 341 changes the voltage signal.

In a further embodiment, the first conductive structure 341 is made of a conductive material of voltage decreasing. For example, in the transmission process of the voltage signal, the high voltage signal H at the first voltage signal area 3111 can be decreased by the first conductive structure 341 from 15V to 10V and then transmitted to the first signal transmission portion 3211. In detail, the conductive material of the first conductive structure 341 may be a field-effect transistor material or a semiconductor material.

In a further embodiment, the liquid crystal display panel further includes a seal layer 35 disposed between the first substrate 31 and the second substrate 32 and disposed in the non-display area 301 of the liquid crystal display panel. The first conductive structure 341 is disposed inside the seal layer 35 and corresponds to the position of the first signal transmission portion 3211. The two substrates are cell-assembled together to form a liquid crystal cell. The seal layer 35 has a sealing function. The first conductive structure 341 inside the seal layer 35 is configured to electrically couple the two electrodes of the two substrates together.

In a further embodiment, a sealing material of the seal layer 35 corresponding to the first signal transmission portion 3211 may include the conductive material of the first conductive structure 341. The conductive material may be mixed into the seal layer 35 (such as an electrically-conductive gold ball) to implement the sealing of the two substrates and the signal transmission, so as to avoid a new manufacturing process.

In a further embodiment, the first common electrode layer 311 further includes a second voltage signal area 3112. The second substrate 32 further includes a second signal transmission portion 3212. The liquid crystal display panel further includes a second conductive structure 342 disposed between the first substrate 31 and the second substrate 32. The second conductive structure 342 is disposed in the non-display area 301 of the liquid crystal display panel and corresponds to a position of the second signal transmission portion 3212. The second conductive structure 342 is configured to electrically couple the second signal transmission portion 3212 to the second voltage signal area 3112. A value of a voltage signal at the second signal transmission portion 3212 is lower than a value of the voltage at the first signal transmission portion 3211. For example, the voltage signal at the first signal transmission portion 3211 is the high voltage signal H, and the voltage signal at the second signal transmission portion 3212 is the ground signal L.

Figure 2:
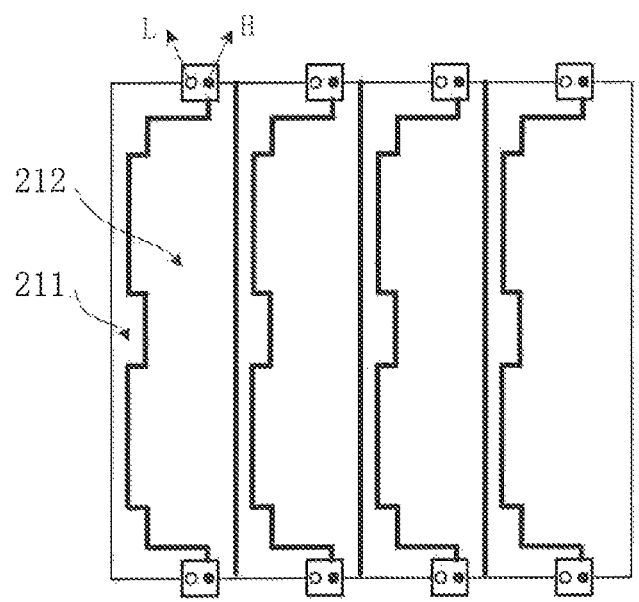
FIG. 2 illustrates that the common electrode on the color filter substrate is insulated in an area-dividing manner by an LOC technology.

In a further embodiment, the first voltage signal area 3111 is manufactured by the LOC technology. That is, the first common electrode layer 311 is insulated in the area-dividing manner by laser, so as to form areas for transmitting different voltage signals. As shown in FIG. 2, according to required circuit patterns, a whole surface of the first common electrode layer 311 is insulated in the area-dividing manner by the LOC technology, so as to form the high voltage areas 211 configured to transmit the high voltage signal H and the ground signal areas 212 configured to transmit the ground signal L. The gaps between different areas are burned by laser. In the present embodiment, the first voltage signal area 3111 is one of the high voltage areas 211 configured to transmit the high voltage signal H, and the second voltage signal area 3112 is one of the low voltage area 212 configured to transmit the ground signal L. Voltage signals are applied to corresponding voltage signal areas and transmitted to corresponding signal transmission portions (curing pads) via the corresponding conductive structures. In a one drop filling process (ODF) of the liquid crystal display panel manufactured by the LOC technology, the conductive materials capable of changing the voltage signals are selected to be added to the seal layer 35 corresponding to positons of the signal transmission portions, so as to implement a glue dispensing process. Based on the premise that the manufacturing devices remain unchanged, the problem that the curing signals cannot be changed in the conventional products using the LOC technology can be solved. As such, a multi-signal transmission in the liquid crystal display panel using the LOC technology can be implemented, and thus the effect of the alignment is better in the HVA manufacturing process.

As shown in FIG. 4, the seal layer 35 is positioned in the non-display area of the liquid crystal display panel (in the periphery of a display area 41). The first conductive structures 341 and the second conductive structure or structures 342 disposed inside the seal layer 35 have an electrically-conductive function. There are plural first conductive structures 341, and there is one or more second conductive structures 342. FIG. 4 only illustrates the position of the seal layer 35 including the first conductive structures 341 and the second conductive structure(s) 342 relative to the non-display device 301. The positions of the first conductive structures 341 and the second conductive structure(s) 342 inside the seal layer 35 and the numbers of the first conductive structures 341 and the second conductive structure (s) are not limited in the present disclosure.

As shown in FIG. 5, the liquid crystal display panel in the present embodiment is designed by the gate driver on array (GOA) technology, and a shared common electrode separately exists. In detail, besides the second common electrode 324, the second substrate 32 further includes a GOA circuit 325 and a shared common electrode 326 which are disposed in a high voltage signal area 51. The second substrate 32 further includes a ground terminal 327 disposed in a low voltage signal area 52. The second common electrode 324, the GOA circuit 325, and the shared common electrode 326 are respectively electrically coupled to one of the first signal transmission portions 3211 and respectively electrically coupled to one of the first voltage signal areas 3111 via a corresponding one of the first conductive structures 341. The ground terminal 327 is electrically coupled to the second signal transmission portion 3212 and electrically coupled to the second voltage signal area 3112 via the second conductive structure 342.

In the present embodiment, voltage signals at three first signal transmission portions 3211 are different. That is, three first conductive structures 341 electrically coupled to the three first signal transmission portions 3211 may be manufactured of conductive materials not having the effect of voltage decreasing or conductive materials having different effects of voltage decreasing, so that a value of the voltage signal at the shared common electrode 326 is greater than a value of the voltage signal at the GOA circuit 325, and the value of the voltage signal at the GOA circuit 325 is greater than a value of the voltage signal at the second common electrode 324.

For example, in the voltage transmission process, the high voltage signal H at the first voltage signal area 3111 is decreased from 15V to 1V by one of the three first conductive structures 341 and then transmitted to one of the three first signal transmission portions 3211. The voltage signal having 1V at the one of the three first signal transmission portions 3211 is electrically coupled to the second common electrode 324, so that the voltage signal at the second common electrode 324 is 1V. In the voltage transmission process, the high voltage signal H at the first voltage signal area 3111 is decreased from 15V to 7V by another of the three first conductive structures 341 and then transmitted to another of the three first signal transmission portions 3211. The voltage signal having 7V at the another of the three first signal transmission portions 3211 is electrically coupled to the GOA circuit 325, so that the voltage signal at the GOA circuit 325 is 7V. In the voltage transmission process, the high voltage signal H having 15V at the first voltage signal area 3111 is directly transmitted to the other of the three first signal transmission portions 3211 by the other of the three first conductive structures 341. The voltage signal having 15V at the other of the three first signal transmission portions 3211 is electrically coupled to the shared common electrode 326, so that the voltage signal at the shared common electrode 326 is 15V (i.e., the same). That is, the conductive materials of the conductive structures corresponding to different signal transmission portions may be different to implement the changes of the voltage transmission with different degrees. As such, applying different voltage signals at different signal transmission portions can control the HVA manufacturing process accurately and effectively, and the effect of the alignment is better.

In the liquid crystal display panel provided by the present embodiment, the first substrate 31 is a color filter substrate, and the second substrate 32 is an array substrate. The liquid crystal layer 33 is disposed between the first substrate 31 and the second substrate 32. The liquid crystal display panel is a liquid crystal display panel having a HVA mode. The common electrode layer on the color filter substrate is insulated in the area-dividing manner by the LOC technology. Rotations of liquid crystal molecules in the liquid crystal layer 33 are controlled by a vertical electric field formed by pixel electrodes on the array substrate and the common electrode layer on the color filter substrate when the liquid crystal display panel operates. The voltage signals can be decreased in the signal transmission process by changing the conductive materials of the conductive structures configured to electrically couple the common electrode layer on the color filter substrate and the signal transmission portions on the array substrate, so that the voltage signal at the color filter substrate and the voltage signals at the signal transmission portions on the array substrate are different. Different conductive materials have different effects of voltage decreasing. The voltage signal at the first voltage signal area 3111 on the color filter substrate can be changed to different voltage signals after being transmitted to the first signal transmission portions 3211 on the array substrate. Accordingly, the GOA circuit, the common electrode on the array substrate, and the shared common electrode have different voltage signals. In the HVA manufacturing process, plural curing signals have a positive function for the adjustment of the alignment of the product and the final result. Based on the premise that the manufacturing devices remain unchanged, the problem that curing signals cannot be changed in the conventional products using the LOC technology can be solved. As such, a multi-signal transmission can be implemented for HVA curing.

INDUSTRIAL APPLICABILITY

The subject matter of the present disclosure can be manufactured and used in the industry and thus has industrial applicability.

What is claimed is:
1. A liquid crystal display panel having a multi-signal high vertical alignment (HVA) mode, wherein the liquid crystal display panel comprises:
   a first substrate, the first substrate comprising a first common electrode layer, and the first common electrode layer comprising a first voltage signal area;
   a second substrate cell-assembled with the first substrate, and the second substrate comprising at least one first signal transmission portion;
   a seal layer disposed between the first substrate and the second substrate, and the seal layer disposed in a non-display area of the liquid crystal display panel; and
   at least one first conductive structure disposed between the first substrate and the second substrate, the first conductive structure disposed inside the seal layer and corresponding to a position of the first signal transmission portion, and the first conductive structure made of a conductive material of voltage decreasing, configured to electrically couple the first signal transmission portion to the first voltage signal area, and configured to change a voltage signal which is transmitted from the first voltage signal area to the first signal transmission portion.

2. The liquid crystal display panel of claim 1, wherein the conductive material of the first conductive structure is a field-effect transistor material or a semiconductor material.

3. The liquid crystal display panel of claim 1, wherein the second substrate comprises a plurality of first signal transmission portions, and at least two of the signal transmission portions have different voltage signals.

4. The liquid crystal display panel of claim 1, wherein a sealing material of the seal layer corresponding to the first signal transmission portion comprises the conductive material of the first conductive structure.

5. The liquid crystal display panel of claim 1, wherein the second substrate comprises at least one of a gate driver on array (GOA) circuit, a second common electrode, and a shared common electrode, and the first signal transmission portion is electrically coupled to one of the GOA circuit, the second common electrode, and the shared common electrode.

6. The liquid crystal display panel of claim 1, wherein the first common electrode layer further comprises a second voltage signal area, and the second substrate further comprises a second signal transmission portion;

the liquid crystal display panel further comprises a second conductive structure disposed between the first substrate and the second substrate, the second conductive structure is disposed inside the seal layer and corresponds to a position of the second signal transmission portion and configured to electrically couple the second signal transmission portion to the second voltage signal area, and a value of a voltage signal at the second signal transmission portion is lower than a value of a voltage at the first signal transmission portion.

7. The liquid crystal display panel of claim 1, wherein the first voltage signal area is manufactured by a laser patterning on CF (LOC) technology.

8. The liquid crystal display panel of claim 1, wherein the first substrate is a color filter substrate, the second substrate is an array substrate and a liquid crystal layer is disposed between the first substrate and the second substrate.

9. A liquid crystal display panel having a multi-signal high vertical alignment (HVA) mode, wherein the liquid crystal display panel comprises:

a first substrate, the first substrate comprising a first common electrode layer, and the first common electrode layer comprising a first voltage signal area;

a second substrate cell-assembled with the first substrate, and the second substrate comprising at least one first signal transmission portion; and at least one first conductive structure disposed between the first substrate and the second substrate, the first conductive structure disposed a non-display area of the liquid crystal display panel and corresponding to a position of the first signal transmission portion, and the first conductive structure configured to electrically couple the first signal transmission portion to the first voltage signal area and configured to change a voltage signal which is transmitted from the first voltage signal area to the first signal transmission portion.

10. The array substrate of claim 9, wherein the first conductive structure is made of a conductive material of voltage decreasing.

11. The array substrate of claim 9, wherein the conductive material of the first conductive structure is a field-effect transistor material or a semiconductor material.

12. The liquid crystal display panel of claim 9, wherein the second substrate comprises a plurality of first signal transmission portions, and at least two of the signal transmission portions have different voltage signals.

13. The liquid crystal display panel of claim 9, wherein the liquid crystal display panel further comprising:

a seal layer disposed between the first substrate and the second substrate, and the seal layer disposed in the non-display area of the liquid crystal display panel;

the first conductive structure disposed inside the seal layer and corresponding to the position of the first signal transmission portion.

14. The liquid crystal display panel of claim 13, wherein a sealing material of the seal layer corresponding to the first signal transmission portion comprises the conductive material of the first conductive structure.

15. The liquid crystal display panel of claim 9, wherein the second substrate comprises at least one of a gate driver on array (GOA) circuit, a second common electrode, and a shared common electrode, and the first signal transmission portion is electrically coupled to one of the GOA circuit, the second common electrode, and the shared common electrode.

16. The liquid crystal display panel of claim 9, wherein the first common electrode layer further comprises a second voltage signal area, and the second substrate further comprises a second signal transmission portion;

the liquid crystal display panel further comprises a second conductive structure disposed between the first substrate and the second substrate, the second conductive structure is disposed inside the seal layer and corresponds to a position of the second signal transmission portion and configured to electrically couple the second signal transmission portion to the second voltage signal area, and a value of a voltage signal at the second signal transmission portion is lower than a value of a voltage at the first signal transmission portion.

17. The liquid crystal display panel of claim 9, wherein the first voltage signal area is manufactured by a laser patterning on CF (LOC) technology.

18. The liquid crystal display panel of claim 9, wherein the first substrate is a color filter substrate, the second substrate is an array substrate and a liquid crystal layer is disposed between the first substrate and the second substrate.

* * * * *